E. MAURER.
BROODER.
APPLICATION FILED MAY 8, 1915.

1,183,577.

Patented May 16, 1916.

Fig. 1.

Fig. 2.

Inventor,
Erwin Maurer.
By Frederick V. Winters
Attorney

UNITED STATES PATENT OFFICE.

ERWIN MAURER, OF JAMAICA, NEW YORK.

BROODER.

1,183,577.  Specification of Letters Patent.  Patented May 16, 1916.

Application filed May 8, 1915. Serial No. 26,883.

*To all whom it may concern:*

Be it known that I, ERWIN MAURER, a citizen of the United States, residing at Jamaica, Long Island, in the county of Queens and State of New York, have invented certain new and useful Improvements in Brooders, of which the following is a full, clear, and exact specification.

This invention relates to brooders, and has for its object to provide a simplified and generally improved device of this kind which is easily operated and is inexpensive to manufacture.

A further object is to place the heater at a distance from the brooder so that the brooder itself will not be apt to become overheated or parts thereof become hot enough to hurt the chicks should they come in contact therewith.

Other objects will appear as the description proceeds.

The invention will be first hereinafter described in connection with the accompanying drawings, which constitute part of this specification, and then more specifically defined in the claim at the end of the description.

In the accompanying drawings, wherein similar reference characters are used to designate corresponding parts throughout the several views:—Figure 1 is a sectional view of a brooder and heater therefor constructed substantially in accordance with the present invention, and Fig. 2 is a plan view of the brooder.

The brooder comprises a casing 1 in the shape of an inverted pan supported upon legs 2 and having a curtain 3 depending from its lower edge. Within the casing 1 is arranged a drum 4 supported from the top of the casing as by rivets 5 and having its bottom shaped like an inverted cone, as at 6. The sides of the drum 4 are preferably spaced from the sides of the casing 1, as shown in Fig. 1. Within the drum there is arranged an arched or convex baffle plate 7 supported and spaced from the top of the casing 1 by bolts or rivets 8. The plate 7 is also spaced from the side of the drum 4, and said plate and drum are both arranged concentric with the casing 1. The top of the casing is provided with a central opening leading to a flue 9 fitted with a damper or valve 10.

The heat is conveyed to the interior of the drum 4 by a pipe 11 leading from a heating drum 12 and entering through the conical bottom of said drum 4 at one side of its apex. The heating drum 12 is arranged on a lower level than the brooder, so that the pipe 11, which communicates with the middle of the top of said heating drum, may extend on a straight incline under the casing 1 between adjacent supports 2 to the bottom of the drum 4. The heat will thus travel a straight upwardly inclined course from the heater to the drum of the brooder, very little of the heat being lost in transit through the pipe 11, while the spacing of the heater away from the brooder prevents parts of the latter from getting too hot, that is, hot enough to injure or burn the chicks which gather within the curtain 3.

Any suitable heating appliance may be used in the heating drum 12, as indicated generally at 13 in Fig. 1, said heater being equipped with a suitable burner 14 preferably arranged immediately below the opening leading to the pipe 11. The drum 12 is provided with openings 15 in its bottom through which air is taken in to be heated and discharged when heated through the pipe 11 into the drum 4 of the brooder. As indicated by the arrows in Fig. 1, the heated air is caused to circulate throughout the drum 4 by the baffle plate 7 before it escapes around the periphery of said plate to the flue 9. By reason of the inverted cone shape of the bottom of the drum 4, the heat will be radiated thereby very evenly throughout the space inclosed by the casing 1 and curtain 3.

Having thus described my invention, what I claim as new and desire to secure by Letters Patent of the United States is:—

A brooder comprising a casing, a flue arranged centrally in the top of the casing, a drum supported from the top of the casing and having an inverted cone-shaped bottom, a convex baffle plate spaced from the sides of the drum and the top of the casing so as to leave the flue open, and means for delivering heated air through the bottom of said drum below the baffle plate.

In testimony whereof I have signed my name to this specification.

ERWIN MAURER.

Copies of this patent may be obtained for five cents each, by addressing the "Commissioner of Patents, Washington, D. C."